(12) United States Patent
Tran

(10) Patent No.: US 11,204,770 B2
(45) Date of Patent: Dec. 21, 2021

(54) MICROPROCESSOR HAVING SELF-RESETTING REGISTER SCOREBOARD

(71) Applicant: ANDES TECHNOLOGY CORPORATION, Hsinchu (TW)

(72) Inventor: Thang Minh Tran, Saratoga, CA (US)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/836,931

(22) Filed: Apr. 1, 2020

(65) Prior Publication Data

US 2021/0311743 A1    Oct. 7, 2021

(51) Int. Cl.
*G06F 9/38*    (2018.01)
*G06F 1/10*    (2006.01)

(52) U.S. Cl.
CPC ............. *G06F 9/3836* (2013.01); *G06F 1/10* (2013.01)

(58) Field of Classification Search
CPC ................................. G06F 9/3836; G06F 1/10
See application file for complete search history.

(56) References Cited

U.S. PATENT DOCUMENTS

| 5,251,306 | A | 10/1993 | Tran | |
|---|---|---|---|---|
| 5,961,630 | A * | 10/1999 | Zaidi | G06F 9/3834 712/200 |
| 10,552,158 | B2 | 2/2020 | Tran | |
| 2005/0114632 | A1* | 5/2005 | Kottapalli | G06F 9/3834 712/225 |
| 2005/0166037 | A1* | 7/2005 | Barrick | G06F 9/3859 712/220 |
| 2007/0130114 | A1* | 6/2007 | Li | G06F 8/4442 |
| 2008/0263249 | A1* | 10/2008 | Watabe | G06F 13/362 710/244 |
| 2008/0263252 | A1* | 10/2008 | Habuto | G06F 1/1632 710/303 |
| 2011/0208950 | A1* | 8/2011 | Tran | G06F 9/3838 712/214 |
| 2015/0089190 | A1* | 3/2015 | Gonion | G06F 9/3013 712/7 |

* cited by examiner

*Primary Examiner* — Farley Abad
(74) *Attorney, Agent, or Firm* — JCIPRNET

(57) ABSTRACT

A microprocessor using a counter in a scoreboard is introduced to handle data dependency. The microprocessor includes a register file having a plurality of registers mapped to entries of the scoreboard. Each entry of the scoreboard has a counter that tracks the data dependency of each of the registers. The counter decrements for every clock cycle until the counter resets itself when it counts down to 0. With the implementation of the counter in the scoreboard, the instruction pipeline may be managed according to the number of clock cycles of a previous issued instruction takes to access the register which is recorded in the counter of the scoreboard.

27 Claims, 7 Drawing Sheets

MICROPROCESSOR HAVING SELF-RESETTING REGISTER SCOREBOARD

BACKGROUND

Technical Field

The disclosure generally relates to a microprocessor, and more specifically, to a microprocessor having a self-resetting register scoreboard for managing data dependency of operation of the microprocessor.

Description of Related Art

In microprocessor architecture, data dependency of an instruction is an ongoing task for improvement to enable the efficient handling of instructions. Register scoreboard has been used for ordering the instructions based on the data dependency of the instructions. For example, one scoreboard bit is used per register in a register file. The scoreboard set a bit for a destination register (operand) when an instruction is issued, and clear the bit when the instruction writes data back to register file. If the register bit is set, which indicates that there is a data dependency, and a subsequent instruction cannot get data until the bit is reset.

As demand for improving performance of the microprocessor, there has grown a need for a microprocessor and a controlling method that may efficiently prevent stalling and interlocking of the instructions.

SUMMARY

The improve the handling of data dependency of the instructions, the disclosure provides a microprocessor including a register file and a scoreboard having a plurality of entries mapped to registers of the register file. Each of the scoreboard entry includes a counter that decrements for every clock cycle, where the counter represents the number of clock cycles a previously issued instruction takes to access (writeback or read) an operand register designated by a current instruction.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
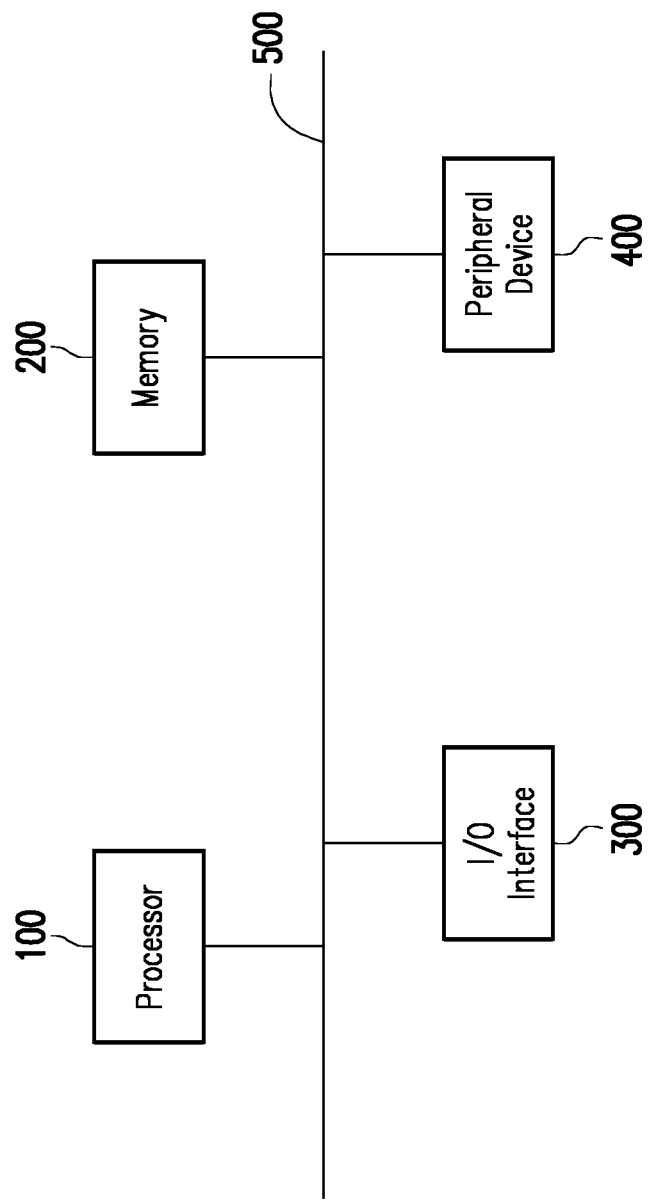
FIG. 1 is a block diagram illustrating a computer processing system in accordance with some embodiments.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

When an instruction is fetched, the instruction is decoded to access to entries in a register scoreboard (also referred to a scoreboard below) to identify the location of the data as well as data dependency. In the disclosure, the scoreboard includes a counter that counts down according to a clock cycle of the microprocessor. Based on a value of the counter, the data dependency of an instruction may be checked for scheduling the instruction.

FIG. 1 illustrates a computer processing system 10 that includes a microprocessor 100, a memory 200, an input/output (I/O) interface 300, a peripheral device 400, and a bus 500 in accordance with some embodiments. The bus 500 may allow bi-direction communications among the components of the computer processing system 10. Some embodiments of the disclosure may use more, less, or different components than those illustrated in FIG. 1. As an example, the computer processing system 10 may further include a timer, a serial peripheral interface, a digital-to-analog converter, an analog-to digital converter, a display driver, a plurality of types of memory, and any other suitable components.

In some embodiments, the microprocessor 100 is configured to execute instructions using an instruction pipeline, in which the execution of the instruction may be decomposed to several stages such as an instruction fetch stage, an instruction decode stage, an instruction execution stage and a writeback stage. The microprocessor 100 may include caches such as a data cache and an instruction cache that have relatively high access rates. The data cache for the microprocessor 100 may be multi-level data cache that may include a L1 data cache, a L2 data cache, and a L3 data cache. The L1 data cache, L2 data cache and the L3 data cache may be located inside or outside the microprocessor 100. In some embodiments, the computer processing system 10 includes a plurality of microprocessors.

The memory 200 is configured to store program codes of instructions and data that are needed for the execution of the instructions. The memory 200 may include non-volatile memory or volatile memory or a combination thereof. For example, the memory 200 may include at least one of random access memory (RAM), dynamic random access memory (DRAM), static random access memory (SRAM), read only memory (ROM), programmable read only memory (PROM), electrically programmable read only memory (EPROM), electrically erasable programmable read only memory (EEPROM), and flash memory.

The I/O interface 300 is configured to couple input devices and output devices to the computer systems 10 through the bus 500. The computer system 10 may receive data from the input devices and send data to the output devices through the I/O interface 300. The I/O interface 300 may include at least one of a serial connection interface and a parallel connection interface in wired or wireless connections. The peripheral device 400 may include a keyboard, a mouse, a sensor, a signal receiver, a monitor and any other suitable devices.

Figure 2:
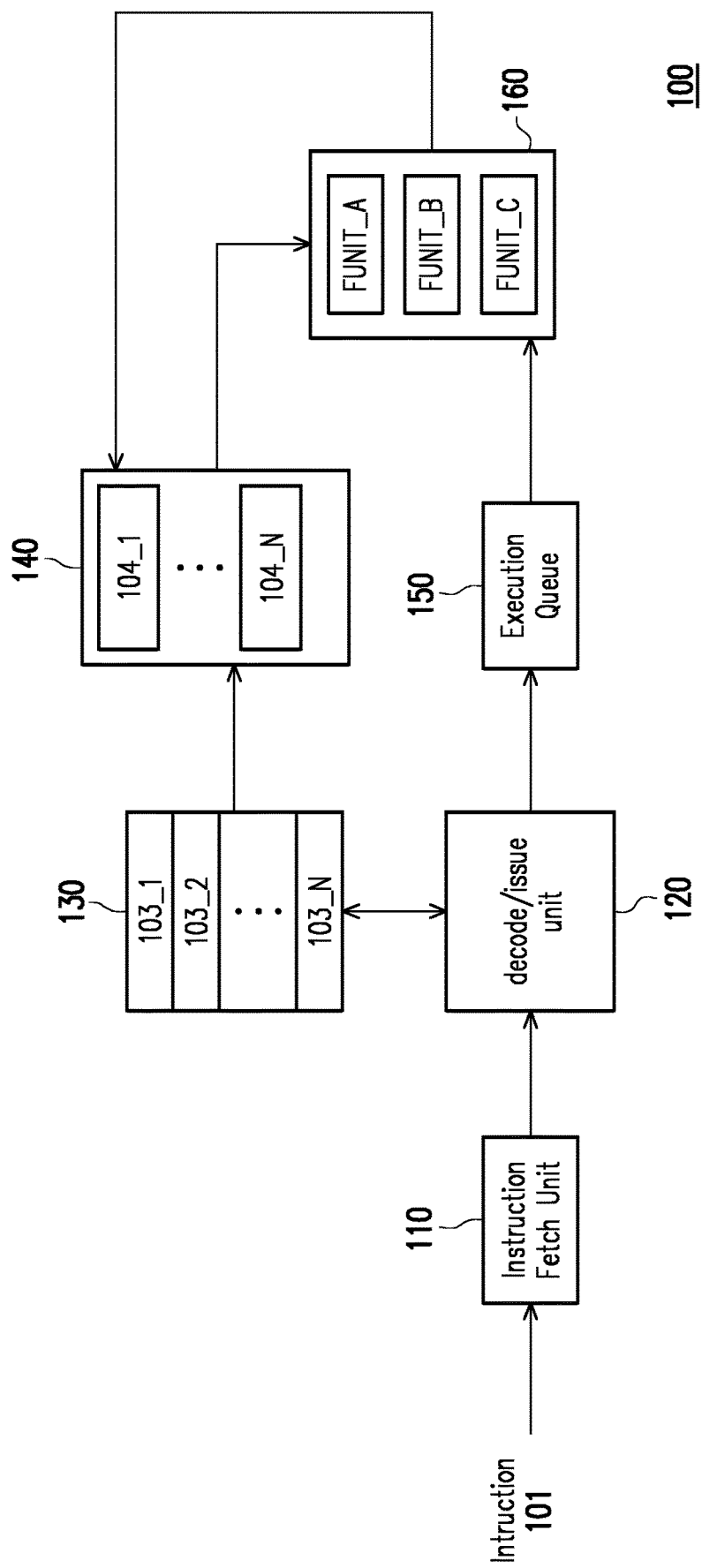
FIG. 2 is a block diagram illustrating an instruction pipeline architecture of the microprocessor in accordance with some embodiments.

FIG. 2 is a block diagram illustrating an instruction pipeline architecture of the microprocessor 100 in accordance with some embodiments. The process described below may be executed by a processor having the architecture as illustrated in FIG. 2. In the embodiment, the microprocessor 100 may include an instruction unit 110, an issue/decode unit 120, a scoreboard 130, a register file 140, an execution queue 150 and a functional unit module 160. The instruction unit 110 is coupled to the issue/decode unit 120. The issue/decode unit 120 is coupled to the scoreboard 130 and the execution queue 150, where the issue/decode unit 120 access the scoreboard 130 to check the status of the data stored in the register to be used by the instruction and schedule the instruction to the execution queue 150. The scoreboard 130 is coupled to the register file 140. The execution queue 150 is coupled the functional unit module 160 where the instructions are executed. The functional unit module 160 is also coupled to the register file 140 for reading data from and writeback result data to the register file 140.

When an instruction 101 is received by the microprocessor 100, the instruction unit 110 fetches the instruction 101 from instruction cache (not shown). In the embodiments, the instruction 101 may include source operand(s) and destination operand. The instruction 101 may be a scalar instruction or a vector instruction depending on the architecture of the microprocessor 100.

The fetched instruction 101 is then sent to the issue/decode unit 120 for decode and issue, where the issue/decode unit 120 accesses the scoreboard 130 to check data dependency of the source operand and/or the destination operand and allocates the data. According to information corresponding to the operands of the instruction 101 received from the scoreboard 130, the instruction 101 is scheduled to the execution queue 150 in the pipeline.

The scoreboard 130 includes N entries 130_1-130_N. Each entry in the scoreboard 130 indicates the status of a register in the register file 140. For example, one bit may be used to track whether a previously issued instruction has writeback the result data. When the instruction 101 is fetched, the issue/decode unit 120 reads the scoreboard 130 to check the data dependency of the operand. The scoreboard 130 may indicate that the data may be accessed from the register file 140. Alternatively, the scoreboard 130 may indicate that at least one operand of the instruction has data dependency. In other words, data corresponding to the operand has not writeback from the previously issued instruction, and the microprocessor has to wait for the data to return from the result data bus before executing the instruction 101. In some other embodiments, each entry of the scoreboard 130 may include bits that track the location of the result data and when the result data is available.

In the embodiments, each of the entries 130_1-130_N in the scoreboard 130 includes a counter (may also be referred to as a counter value) which is configured to count down according to the clock cycle of the microprocessor 100. For example, the counter would decrement by one at rising or falling edge of each clock cycle of the microprocessor 100. In the embodiment, the number of entries of the counter 130 may equal to the number of registers in the register file 140. For example, if the register 140 includes 32 registers, the scoreboard 130 would include 32 entries, where one entry of scoreboard 130 is mapped to one register in the register file 140 for tracking the status of the register. However, the disclosure is not intended to limit the number of the entries in the scoreboard 130. In other embodiments, the number of the entries in the scoreboard 130 may be greater or less than the number of the registers in the register file 140.

The counter of each entry 130_1-130_N may be set at the issuing/decoding stage of instruction, for example, at a stage when the instruction reads the scoreboard to check the data dependency of the operands. Since an execution latency time of the instruction is known, the instruction may set the counter based on the execution latency time of the instruction (which may be referred to as a write time). For example, an ADD instruction would take 2 clock cycles (e.g., execution and writeback stages) to write back the result data to register 3 (R3). In other words, the ADD instruction has an execution latency time of 2 clock cycles. The counter of R3 in the scoreboard 130 would be set to 2. This indicates that R3 would not be ready for a subsequent instruction until 2 clock cycles later. At every clock cycle of the microprocessor, the counter of R3 decrements until the value of the counter self-resets itself when the count value becomes 0 which means no data dependency. In other words, the countdown of the counter self-resets the data dependency of R3 to no data dependency as it counts down to 0. Detail explanation of the counter of the entries in the scoreboard 130 would be described later.

The register file 140 may include a plurality of registers 140_1-140_N that are configured to store data. The registers 140_1-140_N may store data of the operands that are used for execution of the instruction 101, and/or the result data that are writeback to the register file 140 through the writeback operation of the issued instruction 101. The size and number of the registers 140_1 through 140_N may vary according to the architecture of the microprocessor 100. In the embodiments, the register file 140 may include a write port and a read port for the functional unit to access registers in the register file 140.

The functional unit module 160 includes a plurality of functional units FUNIT_A, FUNIT_B, FUNIT_C. When the instruction 101 is received by the functional unit module 160, the corresponding functional unit accesses the register file 140 and loads data therefrom. The functional unit module 160 is configured to execute the instruction 101 based on an order scheduled by the execution queue 150, and then write back a result data to the destination operand (one or more register entry) in the register file 140. The instruction 101 to be executed by the functional units of the microprocessor 100 may include a set of operands that are stored in the register file 140. The functional units FUNIT_A, FUNIT_B, FUNIT_C of the microprocessor 100 may access the register file 140 through the available read ports of the register file 140 to obtain the set of operands for the execution of the instruction 101. The result data outputted by the functional unit module 160 may be written to the register file 140 in a writeback operation through available write port of the register file 140. In some embodiments, the result data of the functional units FUNIT_A, FUNIT_B, FUNIT_C may be forwarded for a subsequent instruction in the execution pipeline to improve performance of the microprocessor 100. In the embodiments, the functional unit module 160 may include a number of processes including, but not limited to, integer multiply, integer divide, an arithmetic logic unit (ALU), shifter, an address generation unit (AGU), a floating-point unit (FPU), a load-store unit (LSU). Although only functional units FUNIT_A, FUNIT_B, FUNIT_C are shown in FIG. 2, the disclosure is not intended to limit the number of functional units. In other embodiments, more function units may be included in the functional unit module 160.

Figure 3:
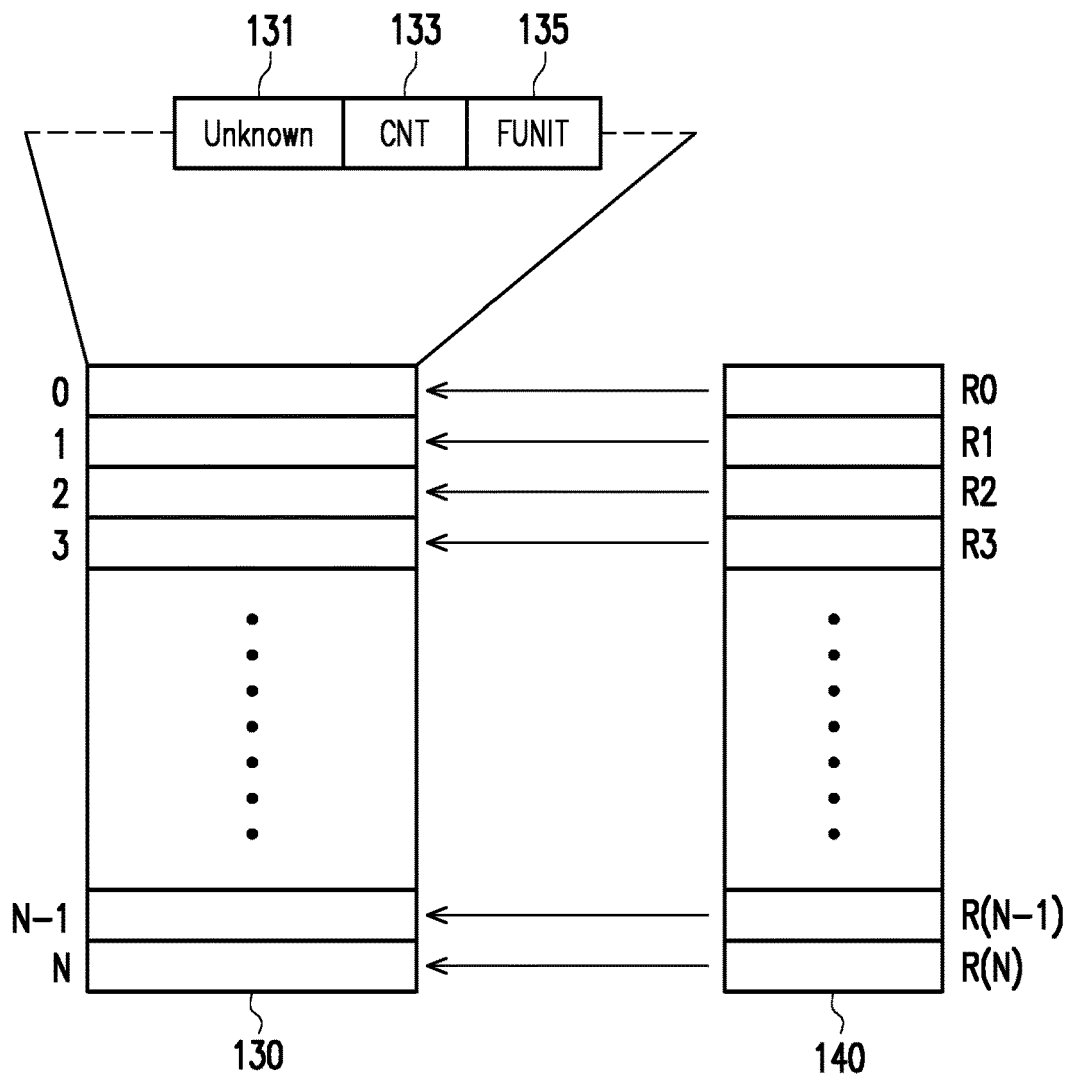
FIG. 3 is a diagram illustrating an exemplary scoreboard having a total of N entries in accordance with some embodiments of the disclosure.

FIG. 3 is a diagram illustrating an exemplary scoreboard having a total of N entries in accordance with some embodiments of the disclosure. As illustrated in FIG. 3, each entry of the scoreboard 130 (may also be referred to as a scoreboard entry) is mapped to a register of the register file 140. Each entry of the scoreboard 130 may include, but not limited to, an unknown field 131, a counter (CNT) field 133, and a functional unit (FUNIT) field 135. In the embodiments, the unknown field 131 is configured to indicate that the execution latency time of the issued instruction is unknown. For example, if the issued instruction is a load instruction, the unknown field 131 of the scoreboard entry corresponding register of the load instruction would be set (logic 1 or 0), because the load operation would dependent on the location of the data. If the data is stored in data cache, it may take 2 clock cycles to load. However, if the data is stored in a memory (e.g., RAM) coupled to the microprocessor, it may take 50-100 clock cycles to load. Integer divide (INT DIV) operation is another example of an instruction having unknown execution latency time. The execution latency time of integer divide operation is unknown for 6 clock cycle since it may take up to 6 clock cycles to determine the number of digits to divide. Therefore, the unknown bit would be set for the first 6 clock cycles, and then reset after the integer divide operation has determined the number of digits for divide operation. Also, the counter field 133 would be set to the known time after reset of the unknown bit in the unknown field 131. In the embodiments, the size of the unknown field 131 may be 1 bit or any other suitable number of bits based on design requirement.

The counter field 133 is configured to record a counter value of a corresponding register. In the embodiments, the counter value of the counter field 133 is set to the execution latency time of the issued instruction. The execution latency time represents the number of clock cycles for a functional unit to writeback the result data to the corresponding register. The counter value in the counter field 133 decrements by one for each clock cycle as long as the counter value is not zero. For example, if a first instruction (e.g., MUL operation) has an execution latency time of 15 clock cycles to writeback the result data to a register 140_5, the counter field 133 of the scoreboard entry 130_5 which is mapped to the register 140_5 is set to 15. Next, a second instruction subsequent to the first instruction is decoded to be an instruction that reads the register 140_5; this type of data dependency is referred to as read-after-write (RAW). The second instruction reads the scoreboard entry 130_5 mapped to the register 140_5 and determines that there is a data dependency. Based on the counter value in the counter field 133, the second instruction waits until there is no data dependency. In other words, the second instruction may be scheduled to execute based on the counter value in the counter field 133. The size of the counter field 133 may be 6 bits or any other suitable number of bits based on design requirement. In some embodiments, the size of the counter field 133 is configured to accommodate the worst case latency time of any instruction (e.g., greater than the worst case latency time of any instruction).

In one of the embodiments, the second instruction subsequent to the first instruction is decoded to be an instruction that writes the register 140_5; this type of data dependency is referred to as write-after-write (WAW). The second instruction read the scoreboard entry 130_5 mapped to the register 140_5 and determines that there is a data dependency. That is, the first instruction is to writeback to the register 140_5, and the second instruction needs to wait for the result data of the first instruction. Thus, in the case of WAW dependency, the counter value in the counter field 133 is set to the execution latency time of the first instruction, where the execution latency time is the amount time (clock cycles) for the first instruction to writeback the result data to the register 140_5. Based on the counter value in the counter field 133, the second instruction waits until a write time of the second instruction is greater than the counter field 133. In other words, the second instruction may schedule based on the counter value in the counter field 133.

In another embodiment, the counter value of the counter field 133 is set to a source operand read time of the instruction at issuing of the instruction. The source operand read time represents the number of clock cycles for a functional unit to read the source data of corresponding register for execution. For example, if a first instruction (e.g., MUL operation) sets to read data in 8 clock cycles from a register 140_5 (source register), the counter field 133 of the scoreboard entry 130_5 which is mapped to the register 140_5 is set to 8. Next, a second instruction subsequent to the first instruction is decoded to be an instruction that writes the register 140_5; this type of data dependency is referred to as write-after-read (WAR). The second instruction cannot write the register 140_5 until after the first instruction reads data from the register 140_5. The second instruction reads the scoreboard entry 1305 mapped to the register 140_5 and determines that there is a data dependency. Based on the counter value in the counter field 133, the second instruction waits until a write time of the second instruction is equal or greater than the counter field 133. In other words, the second instruction may be scheduled to execute based on the counter value in the counter field 133.

The FUNIT field 135 is configured to record the functional unit from which the result data is written back. In some embodiments, the FUNIT field 135 may be used for forwarding the result data to the subsequent instruction. For example, an ADD instruction is to access register 140_3 which has a data dependency on the destination operand of the previous MUL instruction. In such case, the FUNIT field 135 of the scoreboard entry may record MUL, and the result data of the MUL instruction may be forwarded to the ADD functional unit directly by configuring the logic within the functional unit module 160. In the embodiments, the number of functional units which can independently write back to the register file 140 determines the size of the FUNIT field 135 which may be 3 bits or any other suitable number of bits based on design requirement. Note that the FUNIT of the first and second instruction may be the same FUNIT. The FUNIT field 135 is necessary only if the counter field 133 is associated with the write back time for the issued instructions.

Although FIG. 3 shows a portion of an entry of the scoreboard 130, each entry of the scoreboard 130 may include more fields for managing register file 140. The position of the unknown field 131, the functional unit (FUNIT) field 135, and the counter (CNT) field 133 within each entry of the scoreboard 130 may be arranged differently according to design requirement.

Figure 4:
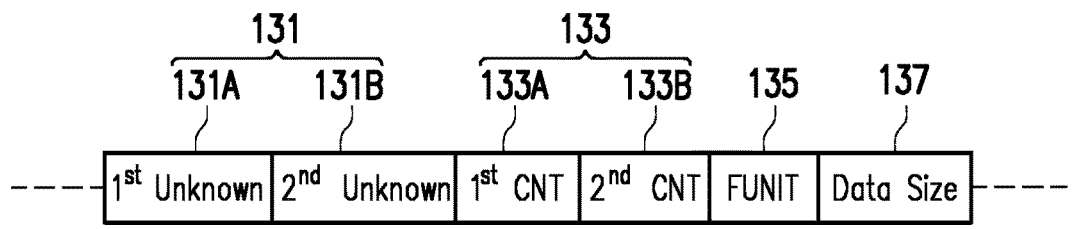
FIG. 4 is a diagram illustrating an entry of the scoreboard in accordance with the other embodiments of the disclosure.

In some other embodiments, each entry may further include a writeback size (WB) field 137. FIG. 4 is a diagram illustrating an entry of the scoreboard in accordance with the other embodiments. The WB size field 137 is configured to record the size of write back data to the register. This allows the issued instruction to know which part of register data is from data forwarding and which part of the data is from register file. For example, the result data output from the FUNIT unit module may be full data, a portion of result data, etc.

In some other embodiments, the unknown field 131 may include a first unknown field 131A and a second unknown field 131B as illustrated in FIG. 4, which may be utilized to record a write dependency and a read dependency of a register, independently. The first unknown field 131A is configured to indicate that the write time (e.g., execution latency time) of the corresponding register is unknown, and the second unknown field 131B is configured to indicate that the read time (e.g., throughput time) of the corresponding register is unknown. The first and second unknown fields 131A, 131B each records a value that is independent and different from each other. Details of the first and second unknown fields 131A, 131B would be described later.

In some other embodiments, the CNT filed 133 may include a first CNT field 133A and a second CNT field 133B as illustrated in FIG. 4. The first and second CNT fields 133A, 133B are configured to record the write time and the read time of a register with respect to clock cycles, independently. For example, the first CNT field 133A may be set to the write time of the corresponding register, and the second CNT field 133B may be set to the read time of the corresponding register. The first and second CNT field 133A, 133B are independent and different from each other. Details of the first and second CNT fields 133A, 133B would be described later.

Figure 5:
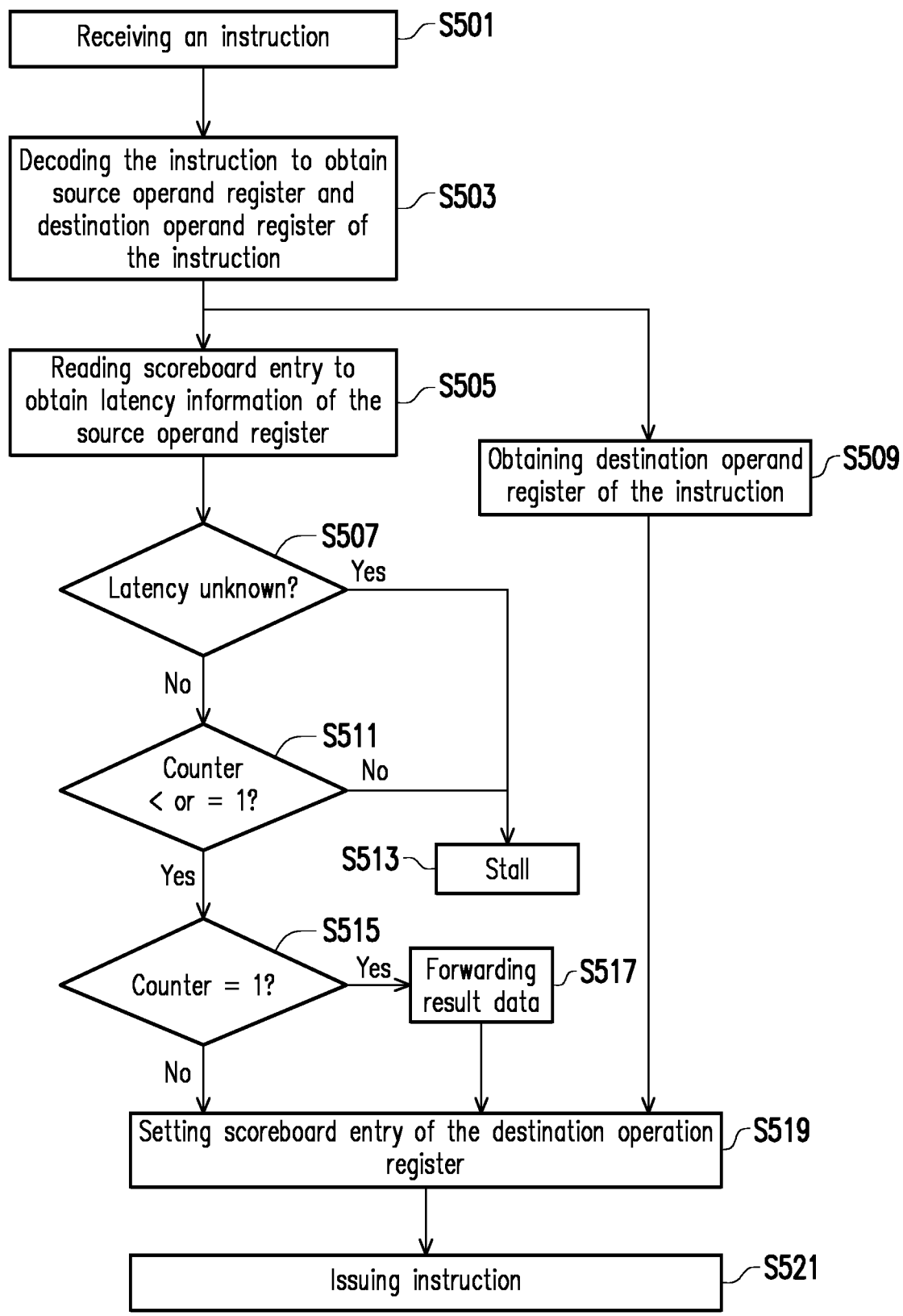
FIG. 5 is a flow diagram illustrating a process flow of issuing an instruction having a scoreboard in accordance with some embodiments of the disclosure.

FIG. 5 is a flow diagram illustrating a process flow of issuing an instruction having a scoreboard in accordance with some embodiments of the disclosure. The process flow illustrated in FIG. 5 may be executed by a processor having the architecture as illustrated in FIG. 2. When an instruction 101 is received (step S501), the instruction 101 is decoded and source operand register and destination operand register of the instruction 101 are obtained (step S503). Next, the issue/decode unit 120 reads the scoreboard to obtain latency information of the source operand register (step S507). In detail, the scoreboard entry that is mapped to the source operand register is accessed, where the unknown field 131, the CNT field 133, and the FUNIT field 135 of the scoreboard entry records the latency information of a previous instruction that writeback to the source operand register. The previous instruction may be any instructions or immediately before the instruction 101.

In step S507, the unknown field 131 is checked to determine whether the execution latency time of the previous instruction on the source operand register is unknown. If the unknown field 131 is set, the process of the instruction 101 goes to stall and access the scoreboard again in the next cycle until the unknown field 131 is reset (step S513). The process of issuing the instruction 101 is stalled because the execution latency time (e.g., the return of the result data of the previous instruction) is unknown. For example, if the first instruction prior to the second instruction is a LOAD instruction, the execution latency time of the first instruction would be unknown until there is a data hit. After data hit, it takes 2 clock cycles to load the result data to the source operand register. If the unknown field 131 is not set, the process of issuing the instruction 101 goes to the next step to read the CNT field 133.

In one of the embodiments, the unknown field 131 may be reset by the corresponding functional unit of the previous instruction. For example, the functional unit may obtain the execution latency time after a data-hit. Once the data to be loaded is located, the execution latency time is known. The unknown field 131 may be reset, and the execution latency time may be set in the CNT field 133.

In step S511, the CNT field 133 (i.e., a counter) is checked to determine the number of clock cycles before the previous instruction writeback a result data to the source operand register. If the counter is greater than 1, the process goes to stall (step S513). If the counter is not greater than 1, the process of issuing the instruction 101 goes to the next step.

In one of the embodiments, the counter value recorded in the CNT field 133 of the source operand register may be added to the execution latency time of the previous instruction, and the sum of which would represent a total execution latency time of the first and second instruction at that particular time. In other words, the counter of the destination operand register may be set according to the total execution latency time of the current instruction and the previous instruction.

In step S515, it is determined whether the counter is equal to 1 which means the result data would be written back to the source operand register in the next clock cycle from the functional unit of the previous instruction. If the counter is equal to 1, logic of the functional unit module 160 or the microprocessor 100 may be configured for forwarding the result data from the functional unit of the previous instruction to the functional unit of the instruction 101 (step S517). The FUNIT field 135 of the source operand register is used here to set up the logic for data forwarding. If the counter is not equal to 1, meaning that the counter field 133 is zero which is no data dependency, the process goes to the next step. In the embodiments, the issued instruction copies the counter field 133 value and the FUNIT field 135 does not have to access the register scoreboard again. The issued instruction may obtain the result data from the functional unit of the previous instruction directly when the copied counter value is decremented to 1.

In step S519, the scoreboard entry of the destination operand register obtained in step S503 is set. The issued instruction has to access the scoreboard once to obtain the availability of the register by accessing the counter field 133 of the scoreboard entry corresponding to the destination operand register. In detail, the unknown field 131 of the destination operand register is configured based on the operation of the instruction 101. For example, if the instruction 101 is a load operation, the unknown field 131 of the destination operand register would be set. The CNT field 133 of the destination operand register would be set according to the execution latency time of the instruction 101. The FUNIT field 135 would be record the functional unit utilized by the instruction 101. In step S521, the instruction 101 is issued.

Based on the above, a scoreboard is introduced for effectively handling data dependency and issuing instructions. The scoreboard includes a counter which is set to the execution latency time of previous instruction when the previous instruction is issued, where the counter decrements every clock cycle until the counter self-resets when the counter reaches 0. The counter value represents the number of clock cycles for writeback of the result data of the previous instruction to a register which is to be access by the issued instruction. Accordingly, the data dependency and scheduling of an issued instruction may be effectively handled based on the counter recorded in the scoreboard entry.

In the followings, the utilization of a scoreboard having a counter would be explained by using various embodiments. The process flow illustrated below may be executed by a processor having the architecture as illustrated in FIG. 2.

Figure 6:
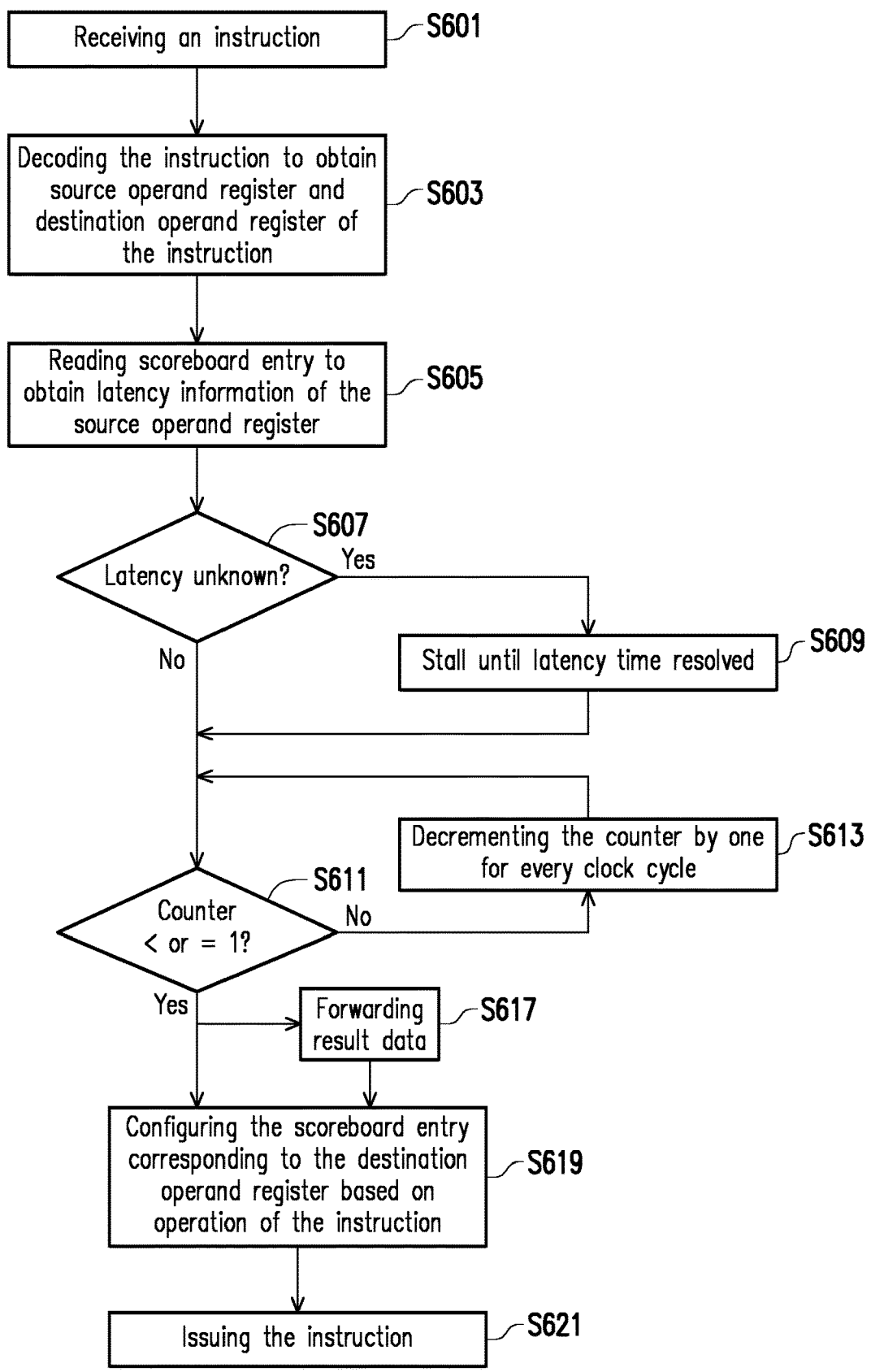
FIG. 6 is a flow diagram illustrating an instruction having read-after-write dependency in accordance with one of the embodiments of the disclosure.

FIG. 6 is a flow diagram illustrating an instruction having read-after-write dependency in accordance with one of the embodiments of the disclosure. In the embodiments, a first instruction is an instruction that writeback to a register 140 (may be any of the registers 140_1 thru 140_N). Subsequent to the first instruction, a second instruction that reads the register 140 is received. The first instruction may be an instruction immediately prior to or any instruction that occurred before the second instruction. The second instruction has a read-after-write dependency to a destination operand register of the first instruction, where the second instruction has to wait until the first instruction complete the execution and writeback the data to the register 140.

In step S601, the second instruction is received. In step S603, the second instruction is decoded to obtain the source operand register and the destination operand register of the second instruction.

In step S605, a scoreboard entry corresponding to the source operand register is accessed to determine whether the source operand register has a data dependency. The source operand of the second instruction reads the scoreboard entry corresponding to the destination operand of the first instruction (i.e., the source operand of the second instruction is the same as the destination operand of the first instruction) as to determine the execution latency of the first instruction. Specifically, the unknown field and CNT field of the scoreboard entry are used in this step for determining the execution latency time of the source operand register of the second instruction. Firstly, the unknown filed is checked as to determine whether the source operand register has an unknown execution latency (step S607). If the unknown field is set, the process goes to stall until the execution latency time of the source operand register is resolved (step S609). For example, if the first instruction prior to the second instruction is a LOAD instruction, the execution latency time of the first instruction would be unknown until there is a data hit. After data hit, it takes 2 clock cycles to load the result data to the source operand register. In other words, the counter field 133 corresponding to the destination register of the first instruction is set to 2 while the unknown filed 131 is reset to 0.

In step S611, the counter of the source operand register is checked. Specifically, the process checks whether the counter is less than or equal to 1. If the counter is not less than or equal to 1, the process goes to step S613 where the counter is decremented by one for every clock cycle. In an alternative embodiment, the process goes to step S617 for data forwarding when the counter equals to 1. As described above, a counter of 1 means that the writeback of the result data would occur in the next clock cycle, and therefore, the result data may be obtained from the functional unit of the first instruction (data forwarding) instead of obtaining the result data from the register.

In step S619, the scoreboard entry corresponding to the destination operand register of the second instruction may be configured. For example, the unknown field 131, the CNT field 133, and the FUNIT field 135 of the scoreboard entry corresponding to the destination operand register may be set according to the execution latency time and the functional unit of the second instruction. In step S621, the second instruction is issued. In another embodiment, because of timing path, a functional unit may not allow forwarding of result data in which case the functional unit field 135 is used to block the forwarding and the counter field 133 must be zero before the dependent instruction can be issued.

Figure 7:
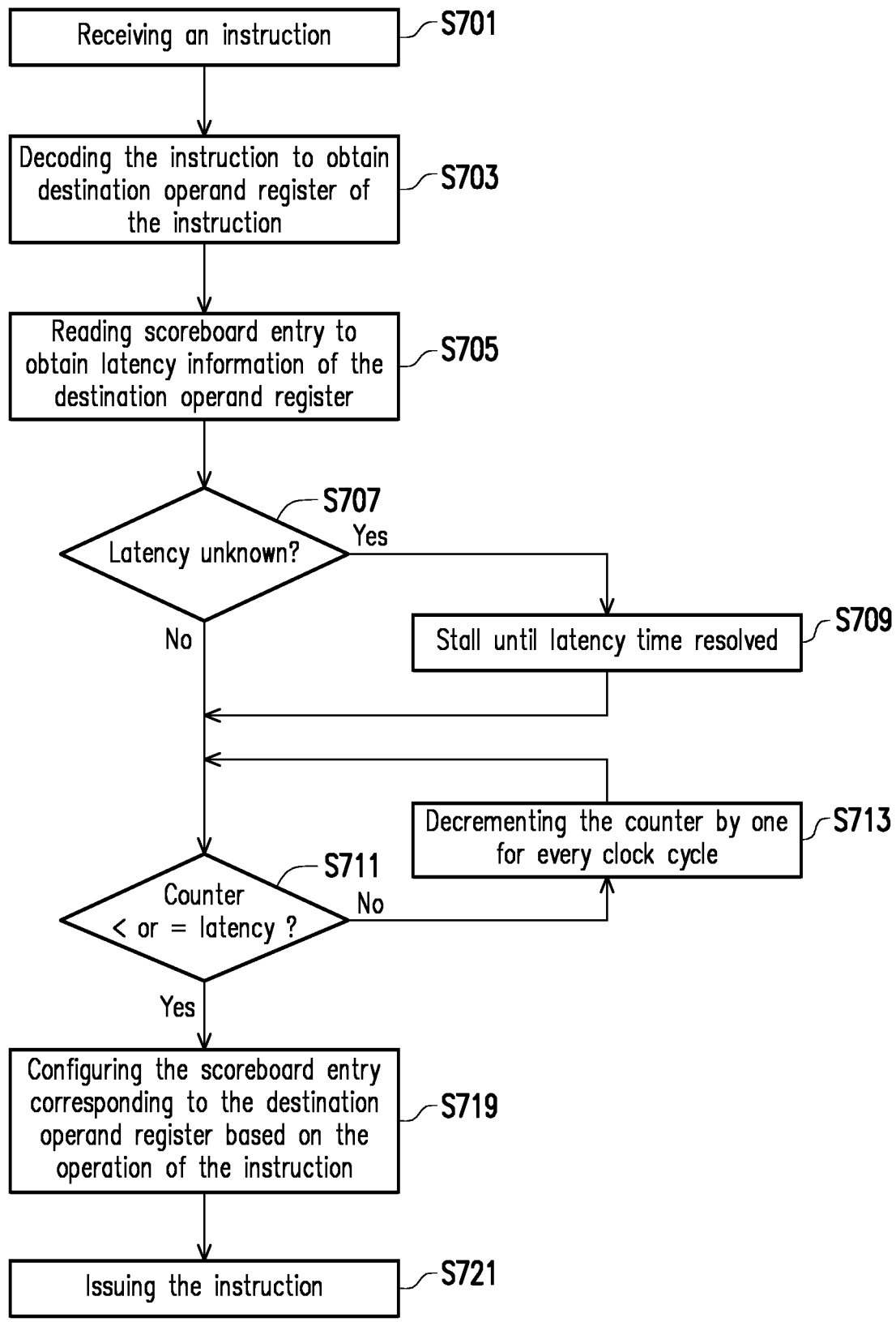
FIG. 7 is a flow diagram illustrating an instruction having write-after-write dependency in accordance with one of the embodiments of the disclosure.

FIG. 7 is a flow diagram illustrating an instruction having write-after-write dependency in accordance with one of the embodiments of the disclosure. In the embodiment, a first instruction is an instruction that writeback to a register 140. Subsequent to the first instruction, a second instruction is also an instruction that writeback to the register 140. The first instruction may be any instruction that occurred before the second instruction. In the embodiment, the destination operand of the second instruction has a write-after-write (WAW) dependency to a destination operand register of the first instruction. The second instruction has to wait until the first instruction writeback the data to the register 140 before the second instruction can write to register 140. In the embodiments, the destination operand of the second instruction reads the scoreboard entry of the destination operand register of the first instruction.

In step S701, an instruction 101 (i.e., second instruction) that writes to a destination operand register of a previously issued instruction (i.e., first instruction) is received. In step S703, the received second instruction is decoded to obtain the destination operand register of the second instruction. In step S705, the second instruction (destination operand) reads the scoreboard entry to obtain latency information of the destination operand register. In step S707, the unknown field of the scoreboard entry corresponding to the destination operand register is accessed. If the unknown field is set, which indicates that the execution latency of the first instruction is unknown, the process is stalled until the execution latency time of the first instruction to the destination operand register is resolved (step S709.) If the unknown field is not set or the unknown field is reset, the process goes to next step to check the counter.

In step S711, the CNT field of the scoreboard entry corresponding to the destination operand register is accessed, which is a counter that records the current execution latency time of the first instruction to the destination operand register. In the embodiment, the second instruction is to writeback to the same destination operand register as the first instruction. Therefore, the second instruction has to wait until the counter of the destination operand register is less than or equal (in another embodiment) to the execution latency time of the second instruction. If the counter is not less than or equal to the execution latency time of the second instruction, the process goes to step S713 where the counter is decremented by one for every cycle. The step S713 would loop back to the step S711 until the counter of the destination operand register is less than or equal to the execution latency time of the second instruction.

When the counter is less than or equal to the execution latency time, the process would go to step S719. In the step S719, the scoreboard entry corresponding to the destination operand register would be set based on the execution latency time of the second instruction. That is, the unknown field, the CNT field, and the FUNIT field would be recorded based on the operation of the second instruction. In step S721, the second instruction is issued.

In one of the embodiments, the issued instruction only has to access the scoreboard once to obtain the execution latency time or throughput time of the previous instruction by accessing the counter field 133 of the scoreboard entry corresponding to the destination operand register of the issued instruction. In other words, the instruction may count down the execution latency time or the throughput time of the previous instruction based on the counter 133 obtained from the scoreboard entry 130_x by itself and proceed with execution when the counter is equal or less than the execution latency time of the issued instruction. If the counter field 133 is corresponding to the execution latency time of the previous instruction, then the data dependency type is write-after-write. If the counter field 133 is corresponding to the throughput time of the previous instruction, then the data dependency type is write-after-read.

Figure 8:
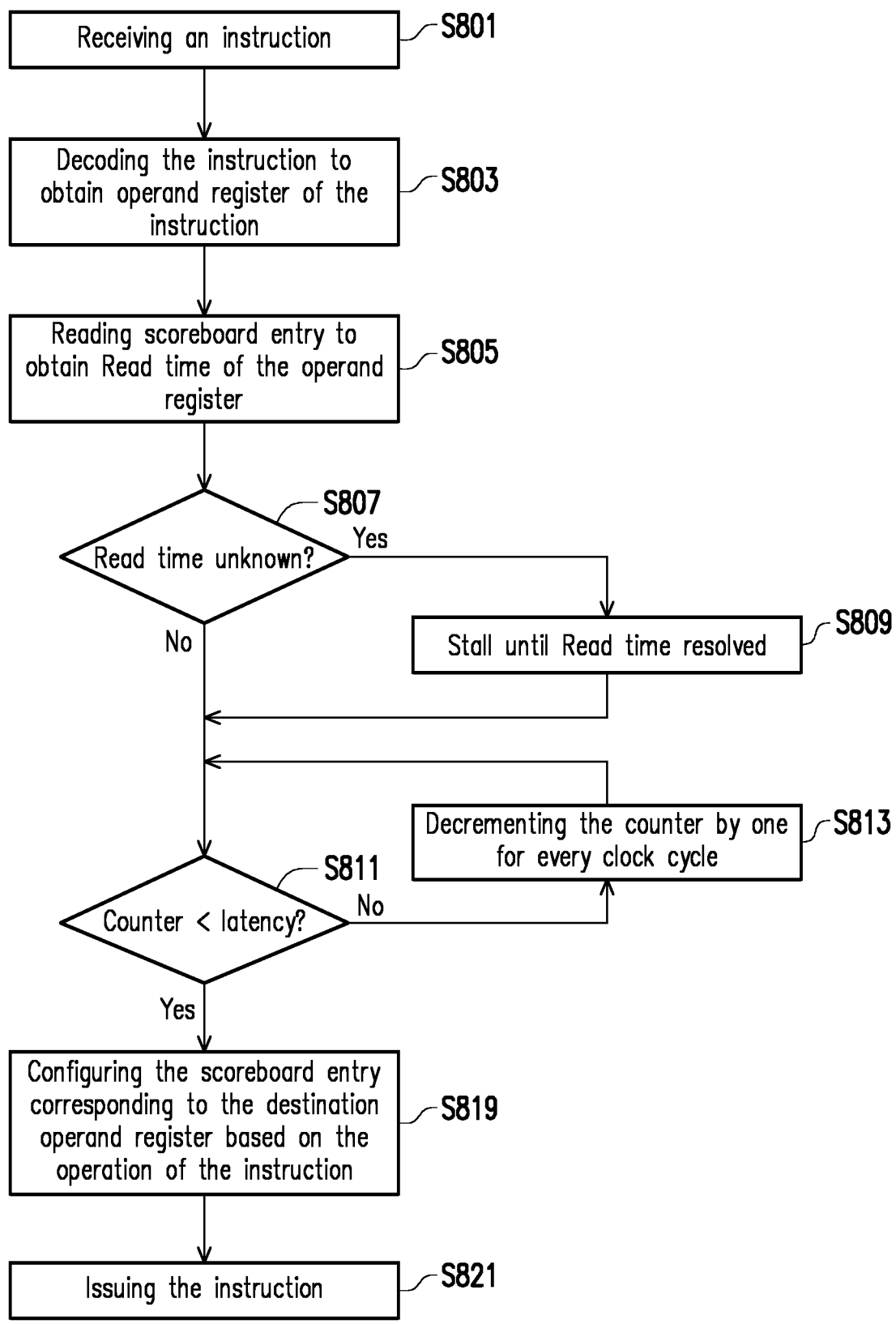
FIG. 8 is a flow diagram illustrating an instruction having write-after-read dependency in accordance with one of the embodiments of the disclosure.

FIG. 8 is a flow diagram illustrating an instruction having write-after-read dependency in accordance with one of the embodiments of the disclosure. In the embodiment, a first instruction is an instruction that reads a register 140. Subsequent to the first instruction, a second instruction is an instruction that writeback to the register 140. The first instruction may be any instruction that occurred before the second instruction. In the embodiment, a destination operand of the second instruction has a write-after-read (WAR) dependency to a source operand register of the first instruction. The second instruction has to wait until the first instruction reads the data from the register 140. In the embodiment, the destination operand of the second instruction reads the scoreboard entry of the source operand register of the first instruction which will be described in FIG. 8.

For example, the first instruction is to read a register 140_2 in 6 clock cycles, and the second instruction is an instruction that is to writeback to the register 140_2 in 2 clock cycles. In the embodiment, the counter of the CNT field is set to a throughput time of the first instruction on the register 140_2. The throughput time is when an instruction reads a source operand register. As compared to the execution latency time which is a completion of the executing an instruction, the throughput time defines the amount of time for the source operand of the first instruction to read the data. Since the first instruction is only to read the register 140_2, the issuing of the second instruction does not have to wait for the first instruction to complete. The second instruction can write to the register 140_2 after the first instruction has read the data from the register 140_2.

In step S801, an instruction 101 (i.e., second instruction) that writes to a source operand register of a previously issued instruction (i.e., first instruction) is received. In step S803, the received second instruction is decoded to obtain the destination operand register of the second instruction. In step S805, the second instruction (destination operand) reads the scoreboard entry to obtain the read time information of the source operand register. In step S807, the unknown field of the scoreboard entry corresponding to the source operand register of the first instruction is accessed. If the unknown field is set, which indicates that the read time of the first instruction is unknown, the process is stalled until the read time of the first instruction to the source operand register is resolved (step S809.) If the unknown field is not set or the unknown field is reset, the process goes to next step to check the counter.

In step S811, the CNT field of the scoreboard entry corresponding to the source operand register of the first instruction is accessed, which is a counter that records the throughput time of the first instruction to the source operand register. In the embodiment, the second instruction is to writeback to the same operand register as the source operand of the first instruction is to read. Therefore, the second instruction has to wait until the counter of the first instruction is less than the execution latency time of the second instruction, which means the source operand of the first instruction has already read the data from the operand register. If the counter is not less than the execution latency time of the second instruction, the process goes to step S813 where the counter is decremented by one for every cycle. The step S813 would loop back to the step S811 until the counter of the first instruction is less than the execution latency time of the second instruction.

When the counter is less than the execution latency time, the process would go to step S819. In the step S819, the scoreboard entries corresponding to the destination operand register or source operand register would be set based on the execution latency time or throughput time of the second instruction. That is, the unknown field, the CNT field, and the FUNIT field would be recorded based on the operation of the second instruction. In step S821, the second instruction is issued.

The description above illustrated the utilization of a self-reset scoreboard with a counter for handling instruction having RAW, WAW, and WAR data dependencies. The followings show other alternatives that may be incorporated into any of the embodiments above.

In one of the embodiments, the data dependency may be further improved by having a delay execution of a subsequent instruction. For example, M clock cycles may be added to the execution latency time and read time of the instruction, where M may be any positive real number. In other words, the instruction is scheduled for to read register file 140 at time M clock cycle to start execution and writeback result data at time M+latency clock cycle to the register file 140 (i.e., M clock cycles plus the execution latency time of the instruction) in the future. The M+latency clock cycle is referred to as the writeback time of the instruction. In the embodiment, the latency counter 133A or read time counter 133B as illustrated in FIG. 4 would be compared to a sum of M clock cycles and the execution latency time and M clock cycles read time, respectively. In the embodiment, the step S611 of FIG. 6 compares to M time instead of 1, step S711 of FIG. 7 compares to the writeback time instead of latency time, and step S811 of FIG. 8 compares to the writeback time instead of latency time.

In one of the embodiments, the issued instruction may be a plurality of micro-operations that performs operations on data stored in one or more registers. With the counter of the scoreboard entry recording the execution latency time of the previous instruction, the microprocessor 100 may pipeline the micro-operations into functional unit module and executes one micro-operation at a time. In the embodiment shown in FIG. 7, the counter is set according to the execution latency time of the previous instruction and compared to 1, where data may be forwarded when the counter is equals to 1 or no data dependency if the counter is equal to 0. With the plurality of micro-operations, a second micro-operation subsequent to a first micro-operation may be issued when the counter is equal to 1 or 0. The result data to which the first micro-operation has a data dependency can be forwarded when the counter is equal to 1, or the result data is writeback to the register when the counter is equal to 0. For a second micro-operation subsequent to the first micro-operation, the second micro-operation may be issued by taking the issuing time of the first micro-operation. In detail, the second micro-operation may be issued when the counter equals to 2 or 1, representing that the result data can be forwarded when the counter is equal to 2 or accessed from the register when the counter equals to 1. Each micro-operation has its own read and writeback times. The read time of the second micro-operation can be +1 or +s from the read time of the first micro-operation. The steps S611, S711, and S811 include comparisons for the read and writeback times of each micro-operation.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A microprocessor, comprising:
    a register file, having a plurality of registers;
    a scoreboard, having a plurality of entries mapped to the registers, each scoreboard entry comprising a counter which decrements for every clock cycle until the counter reaches 0, wherein the counter indicates the number of clock cycles for a previously issued instruction to access the register;
    an issue and decode unit, receiving a first instruction, reading the scoreboard entry corresponding to an operand register designated by the first instruction, and determining whether the operand register has data dependency to a second instruction issued prior to the first instruction according to the counter included in the scoreboard entry corresponding to the operand register; and
    a functional unit module having a first functional unit and a second functional unit, wherein each of the scoreboard entry comprises a functional unit field which records the first functional unit utilized by the second instruction that access the operand register corresponding to the scoreboard entry.

2. The microprocessor of claim 1, wherein the counter is set to a writeback time of the previous issued instruction for writing an operand register designated by the previously issued instruction.

3. The microprocessor of claim 2, wherein the writeback time is an execution latency time of an operation designated by the previously issued instructions that writes to the operand register.

4. The microprocessor of claim 1, wherein the counter is set to a read time of the previous issued instruction for reading an operand register designated by the previously issued instruction.

5. The microprocessor of claim 1, wherein each of the scoreboard entry further comprises an unknown field indicating an access of the previously issued instruction to an operand register corresponding to the previously issued instruction is unknown when the unknown field is set.

6. The microprocessor of claim 5, further comprising:
    an issue and decode unit, receiving a first instruction, reading the scoreboard entry corresponding to an operand register designated by the first instruction, and when the unknown field is set, stalling the first instruction.

7. The microprocessor of claim 6, wherein the unknown field is reset by a functional unit corresponding to the previously issued instruction issued prior to the first instruction when the access of the previously issued instruction to the operand register is known.

8. The microprocessor of claim 1, wherein the functional unit module is reconfigured to forward a result data output by the first functional unit to the second functional unit when the counter equals to a predetermined value.

9. The microprocessor of claim 8, wherein the issue and decode unit issues the first instruction when the counter is equal to a predetermined value.

10. The microprocessor of claim 1, wherein the issue and decode unit issues the first instruction and sets the scoreboard entry corresponding to the operand register designated by the first instruction according to an access time of the first instruction.

11. The microprocessor of claim 1, wherein each of the scoreboard entry further comprises a data size field configured to record a size of data to be accessed to the corresponding register.

12. The microprocessor of claim 1, wherein the previously issued instruction has multiple operations and each operation has a set of scoreboard entries and different access times.

13. A method for a microprocessor to handle data dependency, comprising:
    decoding an instruction to obtain an operand register;
    reading a scoreboard entry corresponding to an operand register designated by the decoded instruction and determining whether the operand register has data dependency to a previously issued instruction issued prior to the decoded instruction according to a counter included in the scoreboard entry corresponding to the operand register, wherein the counter indicates the number of clock cycles for the previously issued instruction to access the operand register, and wherein each of the scoreboard entry comprises a functional unit field which records a first functional unit utilized by the previously issued instruction that access the operand register corresponding to the scoreboard entry; and
    decrementing the counter according to a clock cycle of the microprocessor until the counter reaches 0.

14. The method of claim 13, wherein the counter is set to a write time of the previous issued instruction for writing the operand register.

15. The method of claim 13, wherein the counter is set to a read time of the previous issued instruction for reading the operand register.

16. The method of claim 13, further comprising:
    reading an unknown field of the scoreboard entry and stall when the unknown field is set.

17. The method of claim 16, further comprising:
    resetting the unknown field of the scoreboard entry by a functional unit utilized by the previously issued instruction when an access time of the operand register is resolved.

18. The method of claim 13, further comprising:
reading a functional unit field which records a first functional unit designated by the previous issued instruction accessing the operand register.

19. The method of claim 18, further comprising:
reconfiguring logic in a functional unit module to forward a result data of the previously issued instruction from the first functional unit to a second functional unit designated by the instruction.

20. The method of claim 19, further comprising
reading a data size field to determine the data from the first functional unit being a first portion of an operand register data; and
reading a second portion of the operand register data from the operand register.

21. The method of claim 13, further comprising:
forwarding an operand register data from a first functional unit utilized by the previously issued instruction to a second functional unit and issuing the instruction when the counter equals to a predetermined value.

22. The method of claim 21, further comprising:
setting a counter of the scoreboard entry corresponding to the operand register to according to an access time of the instruction.

23. The microprocessor of claim 13, wherein the previously issued instruction has multiple operations and each operation has a set of scoreboard entries and different access times.

24. A data processing system, comprising:
a microprocessor, wherein said microprocessor includes:
  a register file, having a plurality of registers;
  a scoreboard, having a plurality of entries mapped to the registers, each scoreboard entry comprising a counter which decrements for every clock cycle until the counter reaches 0, wherein the counter indicates the number of clock cycles for a first issued instruction to access the register;
  an issue and decode unit, receiving the first instruction, reading the scoreboard entry corresponding to an operand register designated by the first instruction, and determining whether the operand register has data dependency to a second instruction issued prior to the first instruction based on the counter included in the scoreboard entry corresponding to the operand register; and
  a functional unit module having a first functional unit and a second functional unit, wherein each of the scoreboard entry comprises a functional unit field which records the first functional unit utilized by the second instruction that access the operand register corresponding to the scoreboard entry,
a main memory coupled to the microprocessor;
a bus bridge coupled to the microprocessor; and
an input/output device coupled to the bus bridge.

25. The data processing system of claim 24, wherein the counter value is set to a writeback time of the issued instruction for writing an operand register designated by the issued instruction.

26. The data processing system of claim 24, wherein the counter value is set to a read time of the issued instruction for reading an operand register designated by the issued instruction.

27. The data processing system of claim 24, wherein each of the scoreboard entry further comprises an unknown field indicating an access of a previously issued instruction to an operand register corresponding to the previously issued instruction is unknown when the unknown field is set.

* * * * *